A. W. HUHSMAN.
SEPTIC TANK.
APPLICATION FILED DEC. 2, 1908.

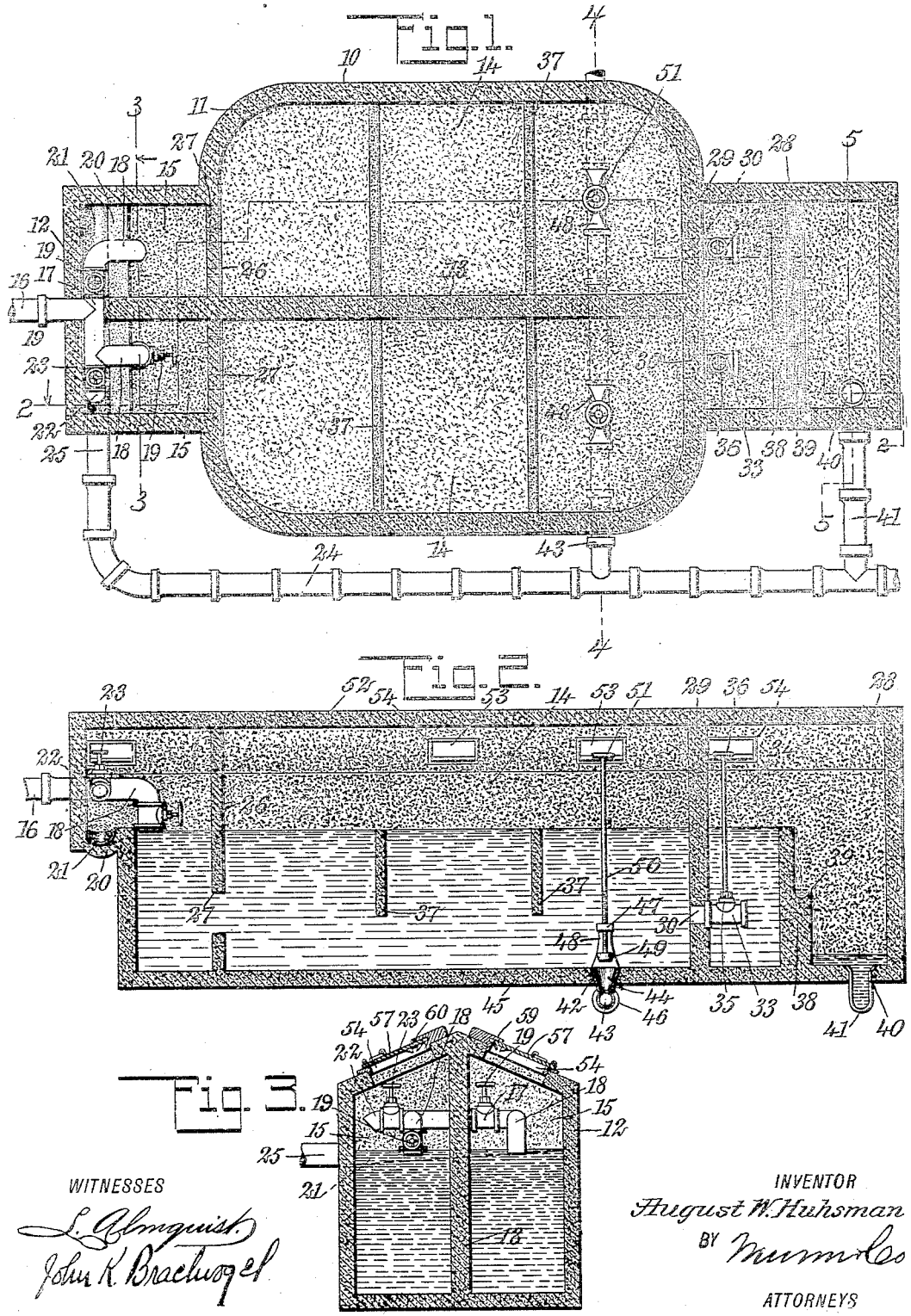

934,917.

Patented Sept. 21, 1909.
2 SHEETS—SHEET 2.

WITNESSES
L. Almquist
John K. Brachvogel

INVENTOR
August W. Huhsman
BY Munn & Co.
ATTORNEYS.

UNITED STATES PATENT OFFICE.

AUGUST W. HUHSMAN, OF STAUNTON, ILLINOIS.

SEPTIC TANK.

934,917.

Specification of Letters Patent.   Patented Sept. 21, 1909.

Application filed December 2, 1908.   Serial No. 465,657.

*To all whom it may concern:*

Be it known that I, AUGUST W. HUHSMAN, a citizen of the United States, and a resident of Staunton, in the county of Macoupin and State of Illinois, have invented a new and Improved Septic Tank, of which the following is a full, clear, and exact description.

This invention relates to septic tanks for sewage disposal and purification, and relates more particularly a septic tank having an inlet chamber and an outlet chamber opening into the tank, walls separating the chambers from the tank, a dividing wall extending longitudinally of the tank into the inlet chamber, inlets discharging within the inlet chamber, baffles arranged transversely of the dividing wall, an overflow within the inlet chamber in case the outlets are clogged so that the material in the tank backs up, escape openings leading from the tank to the outlet chamber, valves controlling the openings, an overflow within the outlet chamber, drain valves for emptying the tank, and an outlet within the outlet chamber, the overflow, the drains and the outlet discharging into a common drain pipe.

The object of the invention is to provide a simple, compact and efficient septic tank for sewage disposal, in which the sewage is partly purified by means of fermentation or putrefaction, in which the passage of the sewage therethrough can be readily controlled, which permits the sewage to escape in case the outlets are clogged so that the material backs up within the tank, and which is provided with manholes, and manhole covers of special form so that the tank can be tightly closed, while access can be easily had thereto when necessary.

The invention consists in the construction and combination of parts to be more fully described hereinafter and particularly set forth in the claims.

Reference is to be had to the accompanying drawings forming a part of this specification, in which similar characters of reference indicate corresponding parts in all the views, and in which—

Figure 4:
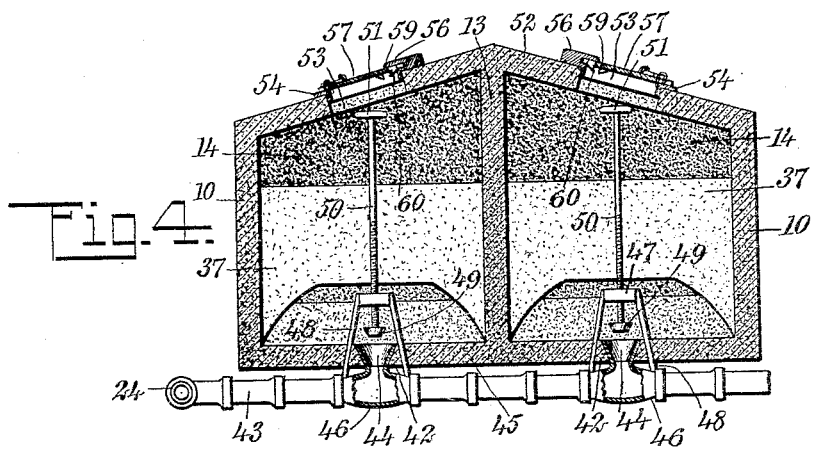
Figure 5:
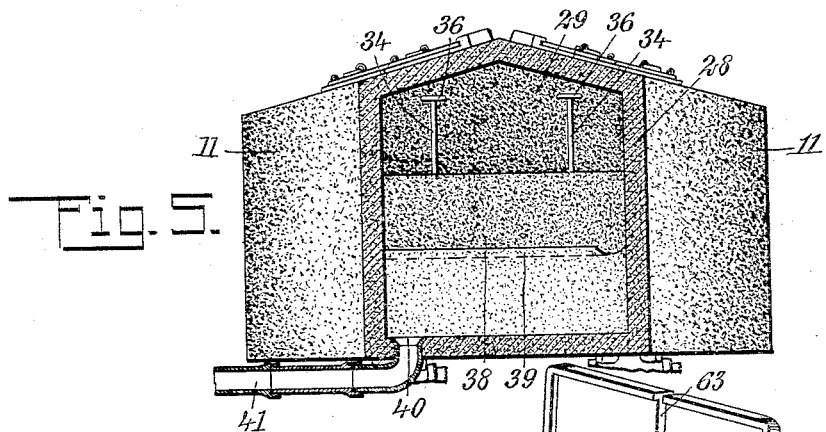
Figure 6:
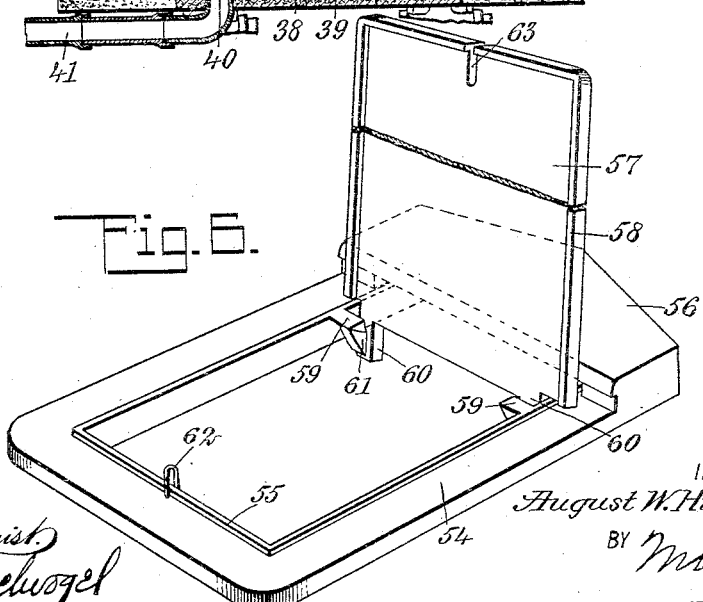

Figure 1 is a horizontal section of an embodiment of my invention; Fig. 2 is a longitudinal section on the line 2—2 of Fig. 1; Fig. 3 is a transverse section on the line 3—3 of Fig. 1; Fig. 4 is a similar section on the line 4—4 of Fig. 1; Fig. 5 is a similar section on the line 5—5 of Fig. 1; and Fig. 6 is a perspective view showing a manhole frame and cover for the same.

Before proceeding to a more detailed explanation of my invention, it should be clearly understood that the tank can be used with any suitable system of sewage disposal in which such devices are employed. In certain systems of sewage disposal the sewage is allowed to pass into septic tanks where it is partly purified by what is known as the "septic process", in which advantage is taken of the fact that sewage is a highly putrescible fluid, richly charged with putrefactive bacteria, in order to decompose it by its own ordinary processes of bacterial fermentation or putrefaction. In this way it is brought into a condition which permits it to be readily nitrified when it is subsequently brought in contact with the earth. Furthermore, when in this condition the suspended matters commonly known as "sludge" can pass partly or wholly into solution. In the septic process the sewage is allowed to stagnate, ferment and putrefy in the septic tanks for a period of considerable length. After escaping from the septic tank the sewage can be filtered or otherwise operated upon in accordance with the system of its disposal.

I prefer to fashion the septic tank of my invention from concrete, though any other similar material adapted for the purpose, for example, brickwork or masonry can also be employed. This detail of construction as well as others of the details, can be varied in accordance with special conditions and individual preference without departing from the underlying spirit of the invention.

Referring more particularly to the drawings, I provide a main chamber or tank 10 which is substantially rectangular in form and preferably has the corners 11 rounded. Needless to say, the form of the tank is unimportant and can be altered as necessary or as desired. At one end the tank has an inlet chamber 12 which practically forms an extension of the tank being separated therefrom by a wall 26. A wall 13 extends longitudinally of the tank and divides it into two compartments 14 and likewise divides the inlet chamber into two compartments 15, extending into the inlet chamber to the rear wall thereof. An inlet or supply pipe 16 extends into the inlet chamber and has a cross pipe 17 within the same. The cross pipe has inlets 18, each of which empties into one of the compartments 15. Valves 19 control the inlets 18.

At the rear wall, the inlet chamber has a shelf 20 forming a trough 21 under the cross pipe. The latter has a discharge nozzle 22 controlled by a valve 23 and adapted to discharge into the trough. A drain pipe 24 is arranged at the outside of the tank and has an open end 25 arranged in an opening of the side of the inlet chamber to receive material flowing into the trough. By means of the trough 21 and the discharge nozzle 22 the material can be diverted into the drain pipe 24 when it is desired to clean or repair the tank. The trough also constitutes an overflow, in case the outlets are clogged so that the material in the tank backs up, and determines the upper limit of the sewage within the tank. The partition wall 26 divides the inlet chamber from the tank and extends to the roof of the tank. It has openings 27 therethrough so that it does not interfere with the movement of the sewage through the tank.

At the end remote from the inlet chamber, the tank has an outlet chamber 28 separated from the tank by a dividing wall 29. The latter has escape openings 30 therethrough at which are arranged controlling valves 33 having screw stems 34 arranged in supporting brackets 35 mounted upon the valve casings. At the upper ends, the valve stems have hand wheels 36 by means of which they can be conveniently manipulated. The compartments 14 of the tank have baffles 37 arranged transversely thereof and forming arches whereby they are spaced from the bottoms of the compartments and do not interfere with the flow of the sewage through the tank except in so far as it is essential in the system of purification; that is to say, the baffles retard the flow sufficiently to allow the purifying action to run its course.

Within the outlet chamber is a transverse weir or overflow wall 38, having about halfway from the bottom a shelf or stop 39, preferably troughed. The sewage passes over the wall 38 to the bottom of the chamber where it can escape through an outlet 40 connected by a pipe 41 with the drain pipe 24.

Within each of the compartments 14, at the bottom thereof, is a drain 42 discharging into a pipe 43 communicating with the drain pipe 24. Each drain has a preferably tapered sleeve 44 extending through an opening in the bottom 45 of the tank and communicating interiorly with an enlarged section 46 of the pipe 43. Above each sleeve 44 is a bracket 47 supported upon uprights 48 extending through the bottom of the tank and mounted upon one of the sections 46. A tapered valve plug 49 is adapted to seat in each of the sleeves 44 and is rigid with a valve stem 50. The latter have threaded engagement with the brackets 47, and further each has at the upper end a handwheel 51 by means of which it can be conveniently manipulated.

The top or roof 52 of the tank preferably slopes in opposite directions from the dividing wall 13. It has a number of manhole openings 53 so that the interior of the tank is accessible for purposes of cleaning it, repair, and the like. Each manhole opening has a substantially rectangular frame 54 provided with an upwardly extending rim 55 and having at one end an overhanging enlargement or flange 56. A cover 57 is mounted upon each frame and has a downwardly extending flange 58 adapted to engage at the rim 55 so that the cover can seat evenly upon the frame. The latter at opposite sides adjacent to the overhang 56 has inwardly-projecting studs 59 adapted to be engaged by extensions 60 of the cover. Each of these extensions has a finger 61. Each cover can be swung upwardly, pivoting upon the studs 59 until the fingers 61 engage at the under sides of the studs to hold the cover in an open position, resting against the overhang, as is shown most clearly in Fig. 6. Each frame has a staple or inverted U-member 62 adapted to project through an edge recess 63 of the cover to permit a lock of any suitable form to be applied to hold the cover in place.

Having thus described my invention, I claim as new, and desire to secure by Letters Patent:

1. A septic tank having an inlet, an overflow within the tank adjacent to said inlet, a drain, an outlet, valves controlling said inlet and said drain and located within the tank, and a common escape pipe connected with said overflow, said drain and said outlet.

2. A septic tank having an inlet chamber opening into the tank, an outlet chamber, a valve-controlled inlet in said outlet chamber, a drain within the tank, valves controlling said inlet and said drain, an overflow wall within said outlet chamber between said outlet and the tank, and an overflow within said inlet chamber, said valves being located inside of the tank and being operable from the outside thereof.

3. A septic tank having an inlet chamber opening into the tank, an outlet chamber, a valve-controlled inlet in said inlet chamber, a drain within the tank, valves controlling said inlet and said drain, an overflow wall within said outlet chamber between said outlet and the tank, an overflow within said inlet chamber, a drain pipe arranged to receive the discharges from said overflow, said drain and said outlet, and baffles within the tank.

4. A septic tank having an inlet chamber opening into the tank, an outlet chamber, a dividing wall between said outlet chamber and the tank and provided with escape openings, a dividing wall separating the tank into compartments and extending into said inlet chamber, whereby said inlet chamber is divided into compartments, a valve-controlled drain within each of said compartments of the tank, a valve-controlled inlet within each of said compartments of said inlet chamber, an outlet within said outlet chamber, and an overflow wall in said outlet chamber.

5. A septic tank having an inlet chamber opening into the tank, an outlet chamber, a dividing wall between said outlet chamber and the tank and provided with valve-controlled escape openings, a dividing wall separating the tank into compartments and extending into said inlet chamber, whereby said inlet chamber is divided into compartments, a valve-controlled drain within each of said compartments of the tank, a valve-controlled inlet within each of said compartments of said inlet chamber, an outlet within said outlet chamber, an overflow wall in said outlet chamber, baffles within said compartments of the tank, and a common pipe connected to said drains and said outlet.

6. A septic tank having an inlet chamber opening into the tank, an outlet chamber, a dividing wall between said outlet chamber and the tank and provided with valve-controlled escape openings, a dividing wall separating the tank into compartments and extending into said inlet chamber, whereby said inlet chamber is divided into compartments, a valve-controlled drain within each of said compartments of the tank, a valve-controlled inlet within each of said compartments of said inlet chamber, an outlet within said outlet chamber, an overflow wall in said outlet chamber, baffles within said compartments of the tank, an overflow within said inlet chamber, a drain pipe connected with said overflow, said drains and said outlet, manholes affording acess to the interior of said compartments, and removable covers for said manholes.

7. A septic tank having an inlet chamber opening into the tank, an outlet chamber, a dividing wall extending into said inlet chamber and separating said tank into compartments and said inlet chamber into compartments, inlets discharging within said compartments of said inlet chamber, baffles arranged transversely of said dividing wall in said compartments of the tank, a dividing wall separating said outlet chamber from the tank and provided with valve-controlled escape openings, valve-controlled drains within said compartments of the tank, an overflow wall within said outlet chamber, an outlet within said outlet chamber, a trough within said inlet chamber and constituting an overflow, a discharge nozzle for diverting the flow from said inlets to said trough, and a common pipe connected with said overflow, said drains and said outlet.

8. A septic tank having an inlet chamber opening into the tank, a partition wall between said inlet chamber and the tank and extending partly to the top of the tank, an outlet chamber, an overflow wall within said outlet chamber, said last wall determining the level of the sewage within the tank, and baffles having arched lower edges permitting the flow of sewage thereunder.

9. A septic tank having an inlet chamber and an outlet chamber, a dividing wall separating said outlet chamber from the tank, a second dividing wall arranged longitudinally of the tank and dividing the same and said inlet chamber into compartments, said first dividing wall having escape openings therethrough, an overflow wall comprising steps and arranged within said outlet chamber to determine the level of the sewage in the tank, a partition wall between said inlet chamber and the tank, and arched baffles arranged in said compartments of the tank.

10. A septic tank having an inlet chamber, an outlet chamber, and a compartment connecting said chambers and arranged to have sewage flow therethrough from said inlet chamber to said outlet chamber, said inlet chamber having a valve-controlled inlet, a part constituting an overflow, and a discharge nozzle for diverting the flow from said inlet to said part constituting the overflow.

11. A septic tank having an inlet chamber, an outlet chamber, and a compartment connecting said chambers and arranged to have sewage flow therethrough from said inlet chamber to said outlet chamber, said inlet chamber having a valve controlled inlet pipe, the inlet chamber having a shelf forming a trough and constituting an overflow, and a valve-controlled discharge nozzle for directing the flow from said inlet pipe to said trough.

12. A septic tank having an inlet chamber, an outlet chamber and a compartment connecting said chambers and adapted to have sewage flow therethrough, said inlet chamber at a predetermined level having a trough constituting an overflow, an inlet pipe extending within said chamber, a valve controlling the inlet pipe and located within the inlet chamber, a valve controlled discharge nozzle connected with said inlet pipe for diverting the flow to said trough, and a drain pipe connected with the trough.

13. A septic tank having an inlet and an outlet, a valve controlling said inlet, a drain for emptying the tank, a valve controlling said drain, and overflow adjacent to the inlet, means for diverting the flow of the material to said overflow, and a common pipe connected with said overflow, said drain and said outlet.

14. A septic tank having an inlet chamber and an outlet chamber, a drain for emptying the tank, a valve controlling the drain, an overflow within the inlet chamber, a valve controlled inlet pipe extending into the inlet chamber, a valve controlled discharge nozzle connected with said inlet pipe for diverting the flow of the material to said overflow, and a common escape pipe connected with said overflow, said drain and said outlet chamber.

15. A septic tank having an inlet chamber opening into the tank, an outlet chamber separated from the tank by a division wall, the said division wall being provided with escape openings and valves for controlling said openings, the said outlet chamber having an outlet, and a stepped overflow wall in said outlet chamber between the said division wall and the outlet.

In testimony whereof I have signed my name to this specification in the presence of two subscribing witnesses.

AUGUST W. HUHSMAN.

Witnesses:
JOSEPH A. TREMBLE,
CHAS. F. KRUSE.